United States Patent

Sekmakas

[15] 3,668,272

[45] *June 6, 1972

[54] UNSATURATED ETHERS OF POLYALKOXY SILANES AND THERMOSETTING SYSTEMS CONTAINING COPOLYMERS THEREOF

[72] Inventor: Kazys Sekmakas, Chicago, Ill.

[73] Assignee: De Soto, Inc., Chicago, Ill.

[ * ] Notice: The portion of the term of this patent subsequent to Sept. 23, 1986, has been disclaimed.

[22] Filed: June 22, 1970

[21] Appl. No.: 48,958

Related U.S. Application Data

[63] Continuation of Ser. No. 519,524, Jan. 10, 1966, abandoned.

[52] U.S. Cl.................260/826, 117/132 BS, 117/161 ZA, 260/22 S, 260/31.4 R, 260/33.4 SB, 260/33.6 SB, 260/41 B, 260/46.5 Y, 260/46.5 UA, 260/448.8 R, 260/827
[51] Int. Cl..................C08f 11/04, C08f 35/06, C08g 47/10
[58] Field of Search..........................260/826, 827, 46.5 UA

[56] References Cited

UNITED STATES PATENTS

| | | | |
|---|---|---|---|
| 2,481,349 | 9/1949 | Robie et al. | 260/46.5 |
| 3,468,836 | 9/1969 | Sekmakas | 260/827 |
| 3,318,971 | 5/1967 | Chloupek et al. | 260/826 |
| 3,261,881 | 7/1966 | Christenson et al. | 260/826 |
| 2,945,003 | 7/1960 | Olson et al. | 260/827 |
| 3,203,919 | 8/1965 | Brachman | 260/827 |
| 3,450,792 | 6/1969 | Sekmakas | 260/827 |

*Primary Examiner*—Samuel H. Blech
*Attorney*—Dressler, Goldsmith, Clement & Gordon

[57] ABSTRACT

Solvent-soluble, heat-hardening, non-gelled resins are provided by etherifying a polymethoxy siloxane with an unsaturated hydroxy-functional compound, with some of the methoxy groups of the siloxane being preserved for subsequent cure. This ether is then copolymerized with other ethylenically unsaturated materials to form a copolymer which includes methoxy groups carried by the siloxane in order to improve the elevated temperature cure of the resin. The preparation of an unsaturated ether by a reaction in which alcohol instead of water is removed coupled with subsequent polymerization enables larger proportions of the resinous siloxane material to be incorporated into the resin.

14 Claims, No Drawings

UNSATURATED ETHERS OF POLYALKOXY SILANES AND THERMOSETTING SYSTEMS CONTAINING COPOLYMERS THEREOF

This application is a continuation of my prior Application Ser. No. 519,524, filed Jan. 10, 1966, now abandoned.

The present invention is related to the prior application of myself and LeRoy A. Chloupek, Ser. No. 279,609, filed May 10, 1963 now U.S. Pat. No. 3,318,971, granted May 9, 1967.

The present invention relates to the solvent-soluble, heat-hardening, non-gelled resins and ethylenically unsaturated ethers which form an essential part thereof. The new ethers are provided by etherifying a polymethoxy siloxane with an unsaturated hydroxy compound, especially a polyethylenically unsaturated polyhydric resin, with some of the methoxy groups of the siloxane being preserved for subsequent cure. The ethylenically unsaturated ether so-produced is then copolymerized with monoethylenically unsaturated material copolymerizable therewith, especially including a proportion of hydroxy or methylol functional acrylic monomer to introduce additional sites for cross-linking. The new resins of the invention are particularly useful in organic solvent solution coating compositions which cure at elevated temperature to provide thermoset coatings having greatly enhanced resistance to long term exterior exposure.

The coating compositions may include a proportion of aminoplast resin to aid the cure, but this is not essential when a proportion of hydroxy or methylol functional monomer is present providing an effective capacity for thermosetting cure in the absence of extraneous components.

Organo-silicone resinous materials are known to be slow-curing and to provide film which, though possessing superior durability, lack desirable physical characteristics, especially from the standpoint of film flexibility, toughness, and impact resistance.

Thermosetting acrylic polymers are also known and these are adapted for rapid cure and generally can be formulated to provide reasonably tough and flexible films having adequate adhesion to a metal substrate.

The physical blending of silicone resins with commercially available thermosetting acrylic resins has been tried, but without significant success. Small proportions of silicone resin accomplished little and large proportions of silicone resin degrade the rapid curing character of the thermosetting acrylic resin and the films produced from such mixtures are brittle and of limited utility.

In said Application Ser. No. 279,609, aldehyde-modified amide interpolymers are modified with hydroxy-terminated organo-silicone resinous material condensed onto side chains of the interpolymer to form new resins which cure rapidly at elevated temperature to form films having good adhesion to metal as well as good flexibility and improved resistance to exterior exposure. While the proportion of silicone resinous material in the teachings of said application may vary within a large range, commercial practicalities limit the proportion of silicone resin which can be incorporated and, correspondingly, the durability on exterior exposure of the cured coatings. In the present development, larger proportions of silicone resinous material can be incorporated into the interpolymer to obtain enhanced durability on exterior exposure while retaining adequate film flexibility, toughness and impact resistance and without unduly degrading the rate of cure.

The first step which is employed in accordance with the invention is the etherification of polymethoxy siloxanes with an ethylenically unsaturated compound having at least one hydroxy group for the etherification reaction, reaction being regulated so that some of the methoxy groups of the siloxane are preserved for subsequent cure.

The ratio of polymethoxy siloxane to unsaturated hydroxy compound can vary considerably and can be expressed on an equivalent basis comparing methoxy functionality in the siloxane with hydroxy functionality in the unsaturated compound. On this basis, the ratio may vary from 1:4 to 4:1, preferably from 1:2 to 2:1. Most preferably, hydroxy functionality is in slight excess up to 1.5:1.0.

The extent of reaction can also vary widely, e.g., from 10 – 90 percent, based on methoxy, or from 10 – 100 percent, based on hydroxy. In the preferred situation, the methoxy group is reacted to an extent of from 25 percent to 75 percent and hydroxy is in excess.

Completion of the siloxane etherification to the extent desired can be accurately determined by the elimination of methanol given off during the reaction. The etherification reaction is carried out at a temperature ranging from 250°–350° F. Ordinarily it is preferred to conduct the reaction under a reduced pressure in order to speed the removal of the volatile product of the etherification.

It is to be noted that the methoxy group is referred to herein as a matter of convenience and this is the group which is preferably used. However, and within the broadest purview of the invention, any lower alkoxy group may be utilized, the term "lower" identifying the presence of from one to four carbon atoms.

Broadly, any polymethoxy silane may be used in accordance with the invention, these being of two types:

$RSiX_3$ or $R_2SiX_2$ in which X identifies the alkoxy or more preferably the methoxy group. It is particularly preferred to employ polymethoxy siloxanes which have the structural unit:

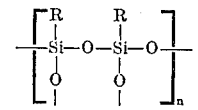

in which n denotes the average number of recurring groups in the resinous molecule.

The preferred hydrocarbon-substituted polysiloxanes are illustrated by dimethyl triphenyl trimethoxy trisiloxane or hydrolysates of the same which contain from 5–20 percent by weight of the methoxy group. The base compound can be referred to as having the following average chemical formula:

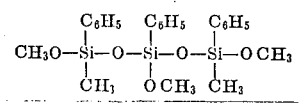

In practice, a compound of the above formula is available with an average molecular weight of 470, a combining weight of 155 and a methoxy content of 20 percent by weight. This product has a viscosity at 77° F. of 13 centistokes (A-3 on the Gardner-Holdt scale).

Another appropriate product is obtained by hydrolysing the above described trisiloxane to reduce its methoxy content to 15 percent by weight, which increases its molecular weight until the viscosity at 77° F. is from 60–120 centistokes (B to E on the Gardner-Holdt scale.

The amount of water used in the hydrolysis can be varied to adjust the final methoxy content and appropriate products can be formulated to include a final methoxy content of from 10–20 percent by weight, corresponding to a molecular weight of from 470 to somewhat over 2,000.

An ethoxy siloxane which may be used is illustrated by a compound having the formula:

$(C_6H_5)_2—Si—(OC_2H_5)_2$.

Especially preferred is a compound having the formula:

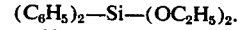
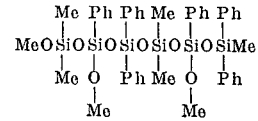

in which Ph identifies the phenyl group and Me the methyl group. This structure contains a plurality of methoxy groups per molecule and has a weight percent methoxy of 13.9 percent. This compound is referred to in the Examples presented hereinafter as "Siloxane Z."

Ethylenically unsaturated materials which carry an hydroxy functional group may be illustrated by monoethylenically unsaturated alcohols, including monohydric alcohols and polyhydric alcohols such as allyl alcohol, methallyl alcohol, crotyl alcohol, 2-butene-1,4 diol, and the like. Ester reaction products of monoethylenically unsaturated carboxylic acid with a polyhydric alcohol may also be used, 2-hydroxy ethyl methacrylate falling within this category. Other monomers within this category which may be used are illustrated by other hydroxy alkyl methacrylates and acrylates such as 2-hydroxy propyl methacrylate, 3-hydroxy propyl methacrylate, 4-hydroxy butyl methacrylate, 2-hydroxy ethyl acrylate, and glycerol monocrotonate, monoacrylate or monomethacrylate. Still further hydroxy-containing monomers which may be used are ethylene glycol allyl ether, propylene glycol allyl ether, butylene glycol allyl ether, diethylene glycol ether, trimethylol propane monoallyl ether and glycerol monoallyl ether. Another monomer, illustrative of the diverse monomers which may be used is 2-hydroxy-methyl-5-norbornene (either the endo isomer or the exo isomer or mixtures thereof).

While monoethylenically unsaturated compounds can be used for etherification of siloxanes, certain polyethylenically unsaturated polyhydric materials are of outstanding utility, namely, polyethylenically unsaturated polyester resins having hydroxy functionality. The unsaturated silicone ethers are produced by reacting polyfunctional alkoxy siloxanes with unsaturated polyester resins. In this way, the silicone ethers of high functionality, reactivity and resinous character are produced using a very simple and economical method.

The polyethylenically unsaturated polyester resins having hydroxyl functionality can be of diverse type. The unsaturation can be introduced into the polyester by the polyesterification of an unsaturated polycarboxylic acid such as maleic acid, fumaric acid, itaconic acid, aconitic acid, glutaconic acid or citraconic acid or by the polyesterification of an unsaturated polyhydric alcohol such as 2-butene-1,4-diol, thus providing highly reactive unsaturation in the linear backbone of the polyester.

On the other hand, unsaturation can be introduced into the unsaturated polyester resin through the presence of unsaturated side chains as by the use of unsaturated monofunctional components such as unsaturated monohydric alcohols or unsaturated monocarboxylic acids. Thus, a proportion of unsaturated monohydric alcohol may be used such as allyl alcohol, methallyl alcohol or crotyl alcohol. Unsaturated monocarboxylic acids are illustrated by crotonic acid and by fatty acids containing conjugated unsaturation such as eleostearic acid, licanic acid, or dehydrated castor oil fatty acids, this conjugated unsaturation providing reactive double bonds to enable copolymerization. Incorporation of monocarboxylic acids is facilitated by the use of glycerine in the production of the polyester. When the glycerine polyester is preformed, the monoacid reacts with the secondary hydroxyl group of the glycerine residue, but, as is known, the polybasic acid, the glycerine and the monoacid may all be polyesterified together in a single reaction. Since the polyester used need not be of high molecular weight, the monofunctional acid or alcohol may function as a chain terminating agent. Other monofunctional agents are also usable to introduce unsaturation for copolymerization such as allyl glycidyl ether. In other words, the unsaturation in the polyester required for copolymerization is preferably selected from the group consisting of: (1)α,β—unsaturation, (2) β-gamma unsaturation, or (3) conjugated unsaturation. Preferably, the unsaturation is in a chain not a part of the linear polyester backbone to thereby reduce the danger of gelation.

Broadly, the unsaturated polyester resin should contain about 0.005 to 0.40 gram mol of ethylenically unsaturated component per 100 grams of polyester. Of course, the precise preferred proportion of unsaturation will vary depending on the reactivity of the unsaturated component (maleic acid is more reactive than crotonic acid). Moreover, practical aspects of processing must be kept in mind since, with less unsaturation, one may copolymerize for longer periods of time and/or more vigorous conditions. With more unsaturation, there is a tendency to gel, especially with more reactive materials such as maleic anhydride or acid. However, one can terminate the reaction before gelation, especially when the reaction is carefully supervised, or the reaction may be effected under very mild conditions. Preferably, and when using polyester containing unsaturation in the backbone of the polyester as by using maleic acid, the polyester resin desirably contains 0.01–0.1 gram mol of unsaturated component per 100 grams of polyester. With less reactive polyesters such as those containing the unsaturation in a side chain as by the use of crotonic acid or allyl alcohol, the polyester resin desirably contains from 0.03–0.3 gram mol of unsaturated component per 100 grams of polyester.

The polyester resin should have an hydroxyl functionality indicated by an hydroxyl number of from 10–300, preferably from 30–250 (milligrams of KOH to saponify 1 gram of resin).

While the molecular weight of the unsaturated polyester is of secondary significance so long as the polyester is not gelled, it is desirable to employ polyesters which have a viscosity in n-butanol at 80 percent solids in the range of from C to Z-6, preferably in the range of from V to Z-2 measured on the Gardner-Holdt scale at 25° C.

While the unsaturated polyester resins which are used in the invention are hydroxy-functional resins, this does not preclude the presence of some acid functionality therein (an acid value in the range of 20–150, preferably in the range of from 40–80). Indeed, a small proportion of acid functionality is desirable and acidity from the polyester as well as from unsaturated acids such as acrylic acid or methacrylic acid used in the copolymerization may desirably confer an acid value on the final product of from 4 to 30, preferably from 8 to 20. The acid in the polyester is preferably a saturated polycarboxylic acid such as adipic acid and the like, so that a portion of the carboxyl termination is provided by saturated materials in order to separate the site of addition copolymerization from the terminal carboxyl groups thereby making these terminal carboxyl groups more available to improve adhesion of the interpolymer product to an underlying metal substrate.

Numerous saturated polycarboxylic acids are well known, the invention preferably employing dicarboxylic acids such as oxalic acid, malonic acid, succinic acid, glutaric acid, adipic acid, pimelic acid, suberic acid, azelaic acid, sebacic acid, phthalic acid, isophthalic acid and terephthalic acid. While dicarboxylic acids are preferred, tricarboxylic acids are also useful such as trimellitic acid. Moreover, and as is well known in alkyd resin production, one may, with equal convenience, employ the anhydride of the acid rather than the acid when the anhydride exists, and the term "polycarboxylic acid" as used herein is intended to include the corresponding anhydrides. Also, and as is well known when the anhydride reacts to form a monoester, this automatically generates the carboxyl group.

In the invention, the silicon-containing component is incorporated by a reaction between hydroxy groups and methoxy groups which splits off methanol under conditions in which methoxy groups are not able to react with themselves so that polymerization of the silicon-containing component by condensation is avoided to a greater extent than would be the case if the silicone-containing component were combined into the resin by condensation of hydroxy groups as in said application Ser. No. 279,609. As a result, more silicon-containing component can be incorporated without difficulty in the present invention.

The unsaturated methoxy-siloxane ethers are rather hard and brittle intermediates. Therefore, they are copolymerized with ethylenically unsaturated monomeric materials, especially those containing a single

group, and preferably including a proportion monomers which contain a primary or secondary hydroxy group, such as methylol methacrylamide, 2-hydroxy ethyl acrylate, 2-hydroxy propyl acrylate, 2-hydroxy propyl butyl maleate, hydroxy propyl methacrylate, methylol acrylamide and allyl alcohol. By appropriately selecting the ratios of unsaturated vinyl acrylic monomers, the resulting products may range from flexible elastic types to very hard, marproof resinous materials.

The ethylenically unsaturated monomers capable of polymerization with unsaturated siloxane ethers may be any one of a number of materials having a polymerizable

group, such as vinyl toluene, styrene, ethyl acrylate, butyl acrylate, vinyl acetate, vinyl stearate, 2-ethylhexyl acrylate, and others.

The silicone copolymers are produced in the invention by a conventional single stage solution copolymerization in which the monomers are dissolved in an organic solvent which is also a solvent for the copolymer which is formed. These reactions are wholly conventional and are generally conducted at reflux in the presence of a free-radical polymerization catalyst such as benzoyl peroxide and in the further presence of chain-terminating agents such as mercaptans. The polymerization is preferably carried out under neutral or slightly alkaline conditions in order to minimize premature condensation reactions which are responsible for the subsequent cure.

In the preferred practice of the invention, at least 0.1 percent of alkaline catalyst, based on the weight of material being copolymerized, is used to minimize the danger of gelation. Normally, not more than 1.0 percent of catalyst is used to avoid the production of resins having slow curing properties.

Any alkaline compound may be used, those having a nitrogen base being preferred. Amines, and especially tertiary amines are particularly preferred. Thus, inorganic alkaline compounds such as alkali metal hydroxides and alkaline earth metal hydroxides are broadly operable, but are not preferred because these introduce impurities into the resinous product. Ammonia is quite suitable as are quaternary ammonium compounds such as tetramethyl ammonium hydroxides. Amines such as ethyl amine and butyl amine may be used. However, tertiary amines illustrated by triethyl amine, tripropyl amine and tributyl amine are particularly preferred.

When the unsaturated polyalkoxy siloxane ethers are copolymerized with other vinyl monomers, and especially when the copolymer or interpolymer includes a proportion of interpolymerized vinyl monomers including hydroxy or methoxy functionality as taught, a unitary resin is formed which is capable of rapid cure at elevated temperature to form films possessing superior hardness and flexibility, as well as excellent exterior durability.

It is first desired to point out that the curing reaction is between the silicon carried methoxy groups and hydroxy or methylol groups carried elsewhere in the interpolymer. Such reactions are much faster than the self condensation of methoxy groups which is the mechanism through which the methoxy siloxane cures in the absence of the present invention. For this reason, the products of the invention cure at much lower temperatures to provide a highly cross-linked, three-dimensional structure.

The presence of the polyalkoxy siloxane resin in accordance with the invention is beneficial within a very large range of proportions. Broadly, the siloxane is incorporated in an amount of from 15-50 percent by weight, based on the total weight of the final resin. Preferably, proportions are from 20-45 percent on the same basis, typical products being illustrated by 30 percent. The maintenance of compatibility, rapid cure and the achievement of films possessing good properties as the proportion of silicone resin increases above 20 percent represents a surprising and most valuable discovery.

It is to be observed that the proportions used are based upon the entire siloxane resin prior to etherification This is because the silicon-oxygen bond as well as the silicon-hydrocarbon bond is very resistant to degradation so that from 80–90 percent of the siloxane compound may be viewed as accounting for the improved durability which is achieved.

While the siloxane-containing interpolymers are importantly useful alone in organic solvent solution coating compositions, they also exhibit excellent compatibility with other film forming resinous materials, and are desirably applied in admixture therewith. The term "admixture" includes partial pre-reaction between the respective components which are blended together. In this regard, excellent compatibility is exhibited with heat-hardening, solvent-soluble polymethylol compounds including urea-formaldehyde condensates and melamine-formaldehyde condensates as well as aldehyde condensates with other triazines, such as benzoguanamine, all of the foregoing falling generally within the heading of aminoplast resins which function to enhance curing capacity when the interpolymers of the invention are deficient in this respect. The aminoplast resin is utilized in an amount of from 5–50 percent by weight, based on the total weight of resin. Excellent compatibility is also exhibited with alkyd, epoxy, and vinyl resins.

In the Examples which follow, all parts are by weight, unless otherwise indicated.

EXAMPLE I.—PREPARATION OF POLYALLYLOXY SILICONE ETHER

Part "A"—Unsaturated Allylic Resin

| Parts by weight: | | |
|---|---|---|
| 1,130 | Trimethylol propane | Charge into reactor equipped with an agitator, reflux condenser, nitrogen inlet tube, thermometer, and Dean-Stark trap. Heat to 400° F. Hold for one hour. Heat to 430° F., and hold for acid value of 9–10. |
| 270 | Diethylene glycol | |
| 85 | Trimethylol Propane monoallyl ether. | |
| 700 | Isophthalic acid | |
| 730 | Adipic acid | |
| 60 | Xylol (reflux solvent) | |
| 1,550 | 2-ethoxy ethanol acetate | Add to 59–60% solids. |

Final characteristics:
Solids (percent) ------------------- 59.6%.
Viscosity (Gardner) ---------------- W.
Color (Gardner) -------------------- 1–2.
Acid value (non-volatile) ---------- 9.1.
Hydroxyl number -------------------- 29.1 (.52 equivalent per 100 grams of resin solids).

Part "B"—Preparation of Allyloxy Silicone Ether

| 1,000 | Polyallylic resin of Part "A" (3.12 equivalents of hydroxyl). | Set Dean-Stark trap. Heat to 220° F. Premix and add to reactor at 220° F. Heat to 280° F. and distill off 45 grams of methanol (48% of theoretical. Hold for Gardner Viscosity of S-T. |
|---|---|---|
| 600 | Siloxane Z (3 equivalents of methoxy). | |
| 800 | Cellosolve acetate. | |
| 1 | Tetrabutyltitanate. | |
| 45 | Butanol | Add butanol. |

Final characteristics:
Solids (percent) ------------------- 48.5.
Viscosity (Gardner) ---------------- J.
Color (Gardner) -------------------- 1.

EXAMPLE II

Preparation of Acrylic Polymer Containing 61.6% Siloxane Ether

| | Interpolymer Composition |
|---|---|
| 61.6 | Poly-Unsaturated Siloxane Ether of Ex. I, Part B |
| 18.8 | Ethyl Acrylate |
| 11.3 | Styrene |
| 7.5 | Acrylamide |
| 0.8 | Glacial Methacrylic Acid |

Procedure of Preparation

Parts by Weight

| | |
|---|---|
| 675 Polyunsaturated siloxane ether (Part B—Ex. I) | Charge into reactor. Heat to 230 F. using light nitrogen sparge |
| 50 Butanol | |
| 40 Paraformaldehyde | |
| 40 Acrylamide | |
| 130 Butanol | |
| 2 Triethylamine | Premix and add over 1¼ hr. |
| 3 Di-tertiary butyl peroxide | |
| 3 Azobisisobutyronitrile | at 235–240 F. |
| 1 Benzoyl peroxide | Hold for 2 hours. |

100 Ethyl acrylate
60 Styrene
4 Glacial methacrylic acid

3 Cumene-hydroperoxide | Add:
Hold for 3 hours to complete monomer conversion

Final Characteristics
Solids (%) 50.6%
Viscosity (Gardner) V — W
Color (Gardner) 2

A high gloss enamel containing the interpolymer of Example II is prepared using the following composition:

28% Titanium Dioxide
32% Nonvolatile Resin of Ex. II

The enamel is drawn down on a chromate treated aluminum panel with a No. 38 wire wound rod and baked for 90 seconds at 475° F.

The following results are obtained:

| | |
|---|---|
| Gloss | 89 (Photovolt 60° reading) |
| Mar Resistance | Very Good |
| Flow | Very good |
| Pencil Hardness | H |
| Reverse Impact | Pass 30 Inch/pounds |
| Acetone Resistance | Passed 50 rubs |
| Adhesion to Metal | Excellent |
| Intercoat Adhesion | Excellent |

As the above results demonstrate, the coatings prepared with siloxane unsaturated ethers exhibit good flexibility, impact, adhesion, and curing properties.

EXAMPLE III.—PREPARATION OF POLYETHYLENICALLY UNSATURATED SILOXANE ETHER

Part "A"

Parts by weight:
1,133.... Trimethylol propane
320..... Diethylene glycol
623..... Isophthalic acid
730..... Adipic acid
30...... Maleic anhydride
60...... Xylol Charge into reactor equipped with an agitator, thermometer, nitrogen inlet tube, reflux condenser, and a Dean-Stark trap. Heat to 400° F. and hold for acid value of 9-10.

1,550.... 2-ethoxy ethanol acetate... Add to 59-60% solids.

Final characteristics:
Solids (percent)................ 59.0.
Viscosity (Gardner)............. S.
Color (Gardner)................. 2.
Acid value (NVM)................ 10.1.
Hydroxyl Number................. 30.54 (.564 equivalent of hydroxy per 100 grams of resin solids).

Part "B"

1,840.... Polyethylenically unsaturated resin of Part "A" (6.1 equivalents of hydroxy).
1,104.... Siloxane Z (5.5 equivalents of methoxy).

Charge into reactor. Set empty Dean-Stark trap to collect methanol. Heat to 230° F.
Premix and add to reactor. Heat to 280° F. and distill off methanol. Hold for viscosity Q-R (128 grams of methanol collected which is 76% of theoretical).

1,472.... Cellosolve acetate
2.2..... Tetrabutyl titanate
82...... Butanol................. Add to reactor.

Final characteristics of siloxane ether:
Solids (percent)................ 49.4.
Viscosity (Gardner)............. I-J.
Color (Gardner)................. 2.

Example IV

Preparation of Hydroxy-Silicone Resin Utilizing Polyethylenically Unsaturated Siloxane Ether Interpolymer Composition
71.4% Unsaturated siloxane ether of Ex. III
7.5 Hydroxy Ethyl Acrylate
7.5 Styrene
11.3 Ethyl acrylate
2.3 Glacial methacrylic acid Procedure of Preparation Parts by Weight
750 Polyethylenically unsaturated polysiloxane ether (Example III Part "B")
20 Butanol
40 Styrene
60 Ethyl acrylate
40 Hydroxy ethyl acrylate
12 Glacial methacrylic acid
3 Di-tertiary butyl peroxide
3 Azobisisobutyronitrile Charge into reactor equipped with an agitator, reflux condenser, thermometer and nitrogen inlet tube. Heat to 230 °F. using nitrogen blanket Premix and add over one hour at 235-245°F.

Hold for 2 hours.

3 Azobisisobutyronitrile | Add
Hold for 6 hours until viscosity is reached  W-X

Final Characteristics
Solids (%) 57.0%
Viscosity (Gardner) W — X
Color (Gardner) Z A high gloss enamel containing the interpolymer of Example IV is prepared using the following composition:

28% Titanium dioxide
32% Nonvolatile resin of Ex. IV

The enamel is drawn down on chromate treated aluminum panel with a No. 38 wire wound rod and baked for 90 seconds at 475° F.

The following results were obtained:

| | |
|---|---|
| Gloss (Photovolt 60° reading) | 91 |
| Flow | Very good |
| Mar resistance | Very good |
| Pencil hardness | F |
| Reverse impact | Pass 30 in.-lb. |
| Acetone resistance | Pass 50 rubs |
| Adhesion to metal | Excellent |
| Intercoat adhesion | Excellent |

As the above results demonstrate, the coatings prepared with siloxane unsaturated ethers exhibit good flexibility, impact, adhesion, and curing properties.

EXAMPLE V.—PREPARATION OF UNSATURATED SILOXANE ETHER UTILIZING DIHYDRIC UNSATURATED ALCOHOL

Parts by weight:
720..... Trimethylol propane monoallyl ether (5.25 equivalents of hydroxy).
1,240.... Dimethyltriphenyl trimethoxy trisiloxane.
10...... Phthalic anhydride (8.26 equivalents methoxy).
10...... Maleic anhydride Charge into reactor equipped with an agitator, reflux condenser, Dean-Stark trap, and nitrogen inlet tube. Heat to 350° F. and distill off 200 grams of methanol (76% of theoretical).

The resulting siloxane ether is light colored viscous liquid having Z viscosity (Gardner).

EXAMPLE VI

Preparation of Silicone-Acrylic Interpolymer Containing 26% of Unsaturated Ether Interpolymer Composition Interpolymer Composition
26% Unsaturated silicone ether of Ex. V
50 Ethyl acrylate
15 Styrene
8 Acrylamide
1 Glacial methacrylic acid
100%

Parts by Weight
300 Aromatic hydrocarbon solvent (boiling range of 145-195°C)
85 Butanol Charge into flask equipped with an agitator, thermometer, and reflux 80 Paraformaldehyde
260 Unsaturated allyloxyether
   (Example V)
80 Acrylamide
3 Triethylamine
255 Butanol
215 2-butoxy ethanol
150 Styrene
500 Ethyl acrylate
10 Glacial methacrylic acid
6 Azobisobutyronitrile
10 Tertiary dodecyl mercaptan
6 Di-tertiary butyl peroxide
2 Benzoyl peroxide condenser. Heat to 230°F. using a nitrogen sparge Premix and add over 2½ hr at 240–250°F.
Hold for 3 hours.

6 Benzoyl peroxide
6 Di cumyl peroxide

Then add in two portions after each two hours.

Hold for 4 hr. for final monomer conversion

Final Characteristics
Solids (%)         51.8%
Viscosity          Y
Color              2 – 3
Weight/Gallon      8.0

EXAMPLE VII.—PREPARATION OF UNSATURATED SILOXANE ETHER

Parts by weight:
751 ..... Siloxane Z (3.75 equivalent of methoxy).
143 ..... Hydroxy ethyl methacrylate (1.1 equivalent of hydroxy).
0.04 .... Hydroquinone
350 ..... 2-ethoxy ethanol acetate
1 ....... Tetrabutyl titanate Charge into reactor equipped with an agitator, reflux condenser, nitrogen sparge, and a Dean-Stark trap. Heat to 260° F. and distill off methanol. Collect 35 grams of methanol in trap. 31% reaction of methoxy-hydroxy is 100% reacted).

EXAMPLE VIII

The silicone-acrylic copolymer was prepared having the following composition:

59%  Unsaturated silicone ether of Ex. VII
8    Acrylamide
20   Styrene
12   Ethyl acrylate
1    Glacial methacrylic acid Procedure of Preparation
Parts by Weight
200 Aromatic hydrocarbon
    solvent (boiling
    range of 145–195°C.)
40 Butanol
35 Paraformaldehyde
40 Acrylamide
100 Butanol
50 2-butoxy ethanol
3 Triethyl amine
3 Di-tertiary-butyl
    peroxide
2 Benzoyl peroxide
60 Ethyl acrylate
100 Styrene
5 Glacial methacrylic acid
10 Tertiary dodecyl
    mercaptane
2 Benzoyl peroxide
410 Siloxane ether solution
    of Example III Charge into a reactor equipped with an agitator, thermometer, nitrogen inlet tube, and a reflux condenser. Heat to 235°F.

Premix all monomers, solvents, and catalysts and add to reactor over 1 to 1½ hours at 235–245°F. Hold for 2 hours at 245°F.

3 Cumene-hydro-peroxide
3 Cumene-hydro-peroxide

After 2 hours, add:
After 4 hours add:
Hold at 230–240°F. for Gardner viscosity of R to T at 50% solids.

Final Characteristics
Solids (%) 51.2%
Viscosity (Gardner) R
Color (Gardner) 4

The baked film (90 seconds at 500° F.) of the above interpolymer was glossy, hard, and adherent to aluminum panels.

EXAMPLE IX

Preparation of Silicone Resin Utilizing Polyethylenically Unsaturated Siloxane Ether:

Interpolymer Composition
71.4% Unsaturated Siloxane ether of Ex. III
7.5% Styrene
18.8% Ethyl Acrylate
2.3% Glacial Methacrylic acid.

Procedure of Preparation
Parts by Weight
750 Polysiloxane ether of
    Ex. III—Part B
20 Butanol Charge into reactor equipped with an agitator, reflux condenser, thermometer and nitrogen inlet tube. Heat to 230°F using nitrogen blanket.

40 Styrene
100 Ethyl Acrylate
12 Glacial methacrylic
    acid
3 Di-tertiary butyl peroxide
3 Azobisisobutyronitrile Premix and add from a separatory funnel over one hour at 235–245°F. Hold for 2 hr.

3 Azobisisobutyronitrile
Azobisisobutyronitrile

Add
Hold for additional 4 hours.

Final Characteristics
Solids (%)            56.7%
Viscosity (Gardner)   U—V
Color (Gardner)       1–2

A high gloss enamel containing the interpolymer of Example IX is prepared using the following composition:

28% Titanium Dioxide
32% Nonvolatile Resin Solids
    The nonvolatile resin solids composition is:

90% Silicone Resin of Example IX
10% Melamine Resin (see Note)

The enamel is drawn down on chromate treated aluminum panels with a No. 38 wire wound rod and baked for 90 seconds at 475° F.

The following results are obtained:

Gloss (Photovolt 60°Reading):   88
Flow                            Very good
Mar Resistant                   Very good
Pencil hardness                 H
Reverse impact                  Pass 15 inch/pound
Adhesion to metal               Excellent
Intercoat adhesion              Excellent Note: The melamine resin utilized in Example IX is a 50 percent solids resin solution having a butyl alcohol/xylol ratio of 40/10 and is prepared as follows:

| Formulation | Parts |
|---|---|
| 1. Butyl Formcel | 1071.5 |
| 2. NaOH (0.5N) | 7.0 |
| 3. Butanol | 301.4 |
| 4. Melamine (recrystallized) | 327.1 |
| 5. Formic Acid | 2.0 |
| | 1709.0 |

Melamine/Formaldehyde/Butanol = 1/5.5/4.5

Procedure:
1. Butyl Formcel adjusted to pH of 8.0 ± 0.1 with NaOH (0.5N).
2. Add butanol and melamine. Heat to reflux in one hour (approximate).
3. Reflux at pH of 8.0 for one hour. Add acid to pH of 5.8 ± 0.1.
4. Azeotrope until charge temperature reaches 243°F (approximately 235 cc H$_2$O).
5. Hold for two additional hours at 117°C to increase mineral spirits tolerance.

6. At the end of the two hours, solids are approximately 66%. Cool reaction.

7. An additional 260 grams butanol and 190 grams of xylol were added to produce a 50% solids resin with 40/10 — butanol/xylol.

Constants

| | |
|---|---|
| %Solids | 50 ± 1 |
| Viscosity | 320 cps |
| Mineral Spirits Tolerance | 9.5/1 (95 cc/10 g.) |
| Acid Number | Less than 1.0 |

The invention is defined in the claims which follow.

I claim:

1. A solvent-soluble, heat-hardening, non-gelled resin comprising an interpolymer of an ethylenically unsaturated ether of:
   a. hydrocarbon-substituted polysiloxane having a plurality of silicon-bonded alkoxy groups in which the alkoxy group contains from one to four carbon atoms; with
   b. an ethylenically unsaturated compound carrying at least one hydroxy group and selected from the group consisting of monoethylenically unsaturated alcohols, monoester reaction products of monoethylenically unsaturated acid with a polyhydric alcohol, monoallyl ethers of polyhydric alcohols, and 2-hydroxy-methyl-5-norbornene; said components (a) and (b) being reacted together to consume from 10-90 percent of the alkoxy content of said component (a), and ethylenically unsaturated material copolymerizable with said ether.

2. A resin as recited in claim 1 in which said polysiloxane is present in an amount of from 15-50 percent by weight, based on the total weight of said resin.

3. A resin as recited in claim 1 in which said polysiloxane contains from 5-20 percent by weight of the methoxy group.

4. A resin as recited in claim 1 in which said interpolymer is provided by a single stage solution copolymerization in the presence of at least 0.1 percent of alkaline catalyst.

5. An organic solvent solution thermosetting coating composition comprising organic solvent having dissolved therein the resin defined in claim 1.

6. An organic solvent solution thermosetting coating composition comprising organic solvent having dissolved therein the resin defined in claim 1 in admixture with aminoplast resin.

7. A resin as recited in claim 1 in which said ethylenically unsaturated material copolymerizable with said ether includes a proportion of ethylenically unsaturated material carrying the hydroxy group.

8. A resin as recited in claim 2 in which said polysiloxane is present in an amount of more that 20 percent by weight, based on the total weight of said resin.

9. A resin as recited in claim 7 in which said polysiloxane is present in an amount of more than 20 percent by weight, based on the total weight of said resin.

10. A resin as recited in claim 1 in which the alkoxy group is the methoxy group and the equivalent ratio of methoxy groups in said component (a) to hydroxy groups in said component (b) is in the range of from 1:4 to 4:1.

11. A resin as recited in claim 10 in which hydroxy functionality is in slight excess up to a ratio of 1.5:1.0 and from 25 to 70 percent of the methoxy content of said component (a) is consumed.

12. A method of producing a solvent-soluble, heat-hardening, non-gelled resin containing hydrocarbon-substituted polysiloxane comprising reacting an ethylenically unsaturated compound carrying at least one hydroxy group with a hydrocarbon-substituted polysiloxane having a plurality of silicon-bonded alkoxy groups in which the alkoxy group contains from one to four carbon atoms, said reaction being continued with the removal of alcohol to consume from 10-90 percent of the alkoxy content of said polysiloxane and thereby produce an alkoxy-functional ether and then copolymerizing said ether with ethylenically unsaturated material copolymerizable therewith in organic solvent solution in a single stage solution copolymerization in the presence of at least 0.1 percent of alkaline catalyst.

13. A method of producing a solvent-soluble, heat-hardening, non-gelled resin containing more than 20 percent by weight, based on the total weight of said resin, of hydrocarbon-substituted polysiloxane comprising reacting an ethylenically unsaturated compound carrying at least one hydroxy group with a hydrocarbon-substituted polysiloxane having a plurality of silicon-bonded alkoxy groups in which the alkoxy group contains from one to four carbon atoms, said reaction being continued with the removal of alcohol to consume from 10-90 percent of the alkoxy content of said polysiloxane and thereby produce an alkoxy-functional ether and then copolymerizing said ether with ethylenically unsaturated material copolymerizable therewith, with the proportion of said ether being sufficient to incorporate more than 20 percent by weight of said siloxane in the copolymer which is produced.

14. A method as recited in claim 13 in which said polysiloxane contains from 5-20 percent by weight of the methoxy group, said ethylenically unsaturated material copolymerizable with said ether includes a proportion of ethylenically unsaturated material carrying the hydroxy group, and said copolymerization is carried out in organic solvent solution in a single stage solution copolymerization in the presence of at least 0.1 percent of alkaline catalyst.

* * * * *